United States Patent
Schiebout et al.

(10) Patent No.: US 6,955,369 B1
(45) Date of Patent: Oct. 18, 2005

(54) TRAILER PROTECTION SYSTEM (76) Inventors: Daniel R. Schiebout, 906 7th St. NW., Orange City, IA (US) 51041; Phillip C. Schiebout, 117 3rd St. NW., P.O. Box 108, Orange City, IA (US) 51041

( * ) Notice: Subject to any disclaimer, the term of this patent is extended or adjusted under 35 U.S.C. 154(b) by 309 days.

(21) Appl. No.: 10/303,474

(22) Filed: Nov. 25, 2002

(51) Int. Cl.⁷ .............................. B62D 25/18
(52) U.S. Cl. .................. 280/154; 280/849; 280/851
(58) Field of Search ............... 280/851, 848, 280/849, 847, 154, 506; 224/43.21, 519, 224/532, 924, 43.31

(56) References Cited

U.S. PATENT DOCUMENTS

| | | | |
|---|---|---|---|
| 1,754,147 A | * | 4/1930 | Cookson ............. 280/851 |
| 1,795,366 A | * | 3/1931 | Hardy ............... 280/851 |
| 2,640,714 A | | 6/1953 | Garner et al. |
| 2,935,336 A | | 5/1960 | Case |
| 3,091,478 A | * | 5/1963 | Ambli .............. 280/851 |
| 3,244,432 A | * | 4/1966 | Ambli .............. 280/851 |
| 3,778,086 A | | 12/1973 | Moore et al. |
| 3,830,520 A | | 8/1974 | Kelly |
| 4,572,532 A | * | 2/1986 | Early et al. ......... 280/851 |
| 4,796,906 A | * | 1/1989 | Sullivan ........... 280/851 |
| 5,121,944 A | * | 6/1992 | Haddox ............. 280/848 |
| D328,447 S | | 8/1992 | Ahleen |
| 5,833,254 A | | 11/1998 | Bucho |
| 6,076,842 A | | 6/2000 | Knoer |
| 6,179,311 B1 | | 1/2001 | Larkin et al. |
| 6,347,809 B1 | | 2/2002 | Mack |
| 6,357,780 B1 | * | 3/2002 | Young .............. 280/506 |
| 6,375,223 B1 | | 4/2002 | Kirckof |
| 6,394,475 B1 | | 5/2002 | Simon |
| 2001/0030407 A1 | | 10/2001 | Burnstein |

* cited by examiner

Primary Examiner—Hau Phan
(74) Attorney, Agent, or Firm—Jeffrey A. Proehl (57) ABSTRACT

A trailer protection system is disclosed that includes a support assembly for being supported on the tow hitch assembly of a vehicle and a flexible deflection structure that extends downwardly from the support assembly. A reinforcing element comprises a first portion extending transverse to and rearwardly of the deflection structure, and second and third portions extending rearwardly and downwardly from the support assembly to the first portion through a plane defined by the deflection structure in a skewed relationship to the plane. A mounting assembly may comprise a clamp plate defining an aperture for receiving the tow hitch assembly with a slot being formed in the clamp plate, and a constriction structure for selectively reducing a size of an inner perimeter of the aperture of the clamp plate to thereby clamp the clamp plate on the portion of the tow hitch assembly. A mounting track may slidably receive a portion of the deflection structure.

19 Claims, 6 Drawing Sheets

TRAILER PROTECTION SYSTEM

BACKGROUND OF THE INVENTION

1. Field of the Invention

The present invention relates to debris deflection devices for vehicles, and more particularly pertains to a new trailer protection system removably mountable on a conventional tow hitch assembly of the vehicle for intercepting flying debris raised by the wheels of a vehicle while offering minimal resistance to air flow through the system.

2. Description of the Prior Art

The use of debris deflection devices such as mud flaps on vehicles is known in the prior art. However, the known devices have various drawbacks. For example, some known devices only provide limited protection because they extend laterally under the vehicles only as far as the approximate width of the wheels (such as is true for traditional mud flaps). Such devices thus do not extend across a relatively large central area under the vehicle, and debris movement through this central area is relatively unimpeded and can damage following vehicles or a trailer being pulled behind the vehicle. Further, some known devices employ relatively solid panels that present significant air flow resistance when the vehicle is moving, and are often pivoted upward by the air flow, which reduces the ability of the solid panel to block flying debris. Structures have been proposed that attempt to resist the upward pivot movement of the devices when subjected to air flow at highway speeds, but these structures themselves can be struck and possibly damaged if they strike the pavement when the vehicles, for example, enters or exits a curb cut of a driveway.

Also, some devices are relatively difficult to mount on a vehicle in a secure manner that will hold during highway travel without loosening, and may also be difficult to remove during times when flying debris protection is not needed. Some of the known devices will mar or otherwise damage the appearance of the portions of the vehicle on which the device is mounted. For example, set screws may be used to bear against structures such as tow hitch assemblies, and the bearing of the set screw against the tow hitch assembly may chip paint when the set screw is turned against the tow hitch assembly.

Another aspect of the known debris deflection devices that may present problems is the inability to adjust the proximity of the device to the ground to accommodate the variation in ride heights of different vehicles. If the user does not want to leave a significant gap between the device and the ground, or does not want a portion of the device to drag on the ground, the user must determine the proper height for the device on his or her particular vehicle, and then either purchase a customized device with the proper height or be able to adjust the height of a one-size-fits-all device.

Such drawbacks as are described above, along with other drawbacks not explicitly set forth herein, have limited the effectiveness and popularity of the known debris deflection devices.

SUMMARY OF THE INVENTION

In view of the foregoing disadvantages inherent in the known types of debris deflection devices now present in the prior art, the present invention provides a new trailer protection system construction wherein the same can be utilized for intercepting flying debris raised by the wheels of a vehicle while offering minimal resistance to air flow through the system.

To attain this, the present invention generally comprises a support assembly for being supported on the tow hitch assembly of the vehicle, with the support assembly having a bottom for orienting downwardly and a top for orienting upwardly when supported on the vehicle. The system also includes a flexible deflection structure extending downwardly from the support assembly.

In one aspect of the invention, reinforcing means is provided for limiting rearward movement of the deflection structure when the deflection structure is mounted on the vehicle. The reinforcing means comprises an elongate reinforcing element including a first portion extending transverse to and rearwardly of the deflection structure, and second and third portions each extending from one of opposite ends of the first portion in a substantially perpendicular relationship to the first portion. The second and third portions of the reinforcing element extend rearwardly and downwardly from the support assembly to the first portion, and extend through a plane defined by the deflection structure in a skewed relationship to the plane.

In another aspect of the invention, a mounting assembly is provided for removably mounting the support assembly on the tow hitch assembly of the vehicle in a transverse orientation. The mounting assembly includes a clamp plate that is mounted on the support assembly and that defines an aperture for receiving a portion of the tow hitch assembly. A slot is formed in the clamp plate and extends from the aperture to an outer perimeter of the clamp plate. The mounting assembly also includes constriction means for selectively reducing a size of an inner perimeter of the aperture of the clamp plate to thereby clamp the clamp plate on the portion of the tow hitch assembly.

In still another aspect of the invention, a mounting track is provided for mounting the deflection structure on the support member. The mounting track is mounted on the bottom of the support member and extends along a portion of the support member, and slidably receives a portion of the deflection structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability of the system to be easily mounted on and dismount from the tow hitch assembly of the vehicle without marring or otherwise damaging the tow hitch assembly. Further, while the deflection elements are flexible and permit air flow between the deflection elements, the reinforcing element restricts significant pivoting of the deflection elements while not increasing the air flow resistance of the deflection elements.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 6 thereof, a new trailer protection system embodying the principles and concepts of the present invention and generally designated by the reference numeral 10 will be described.

Figure 1:
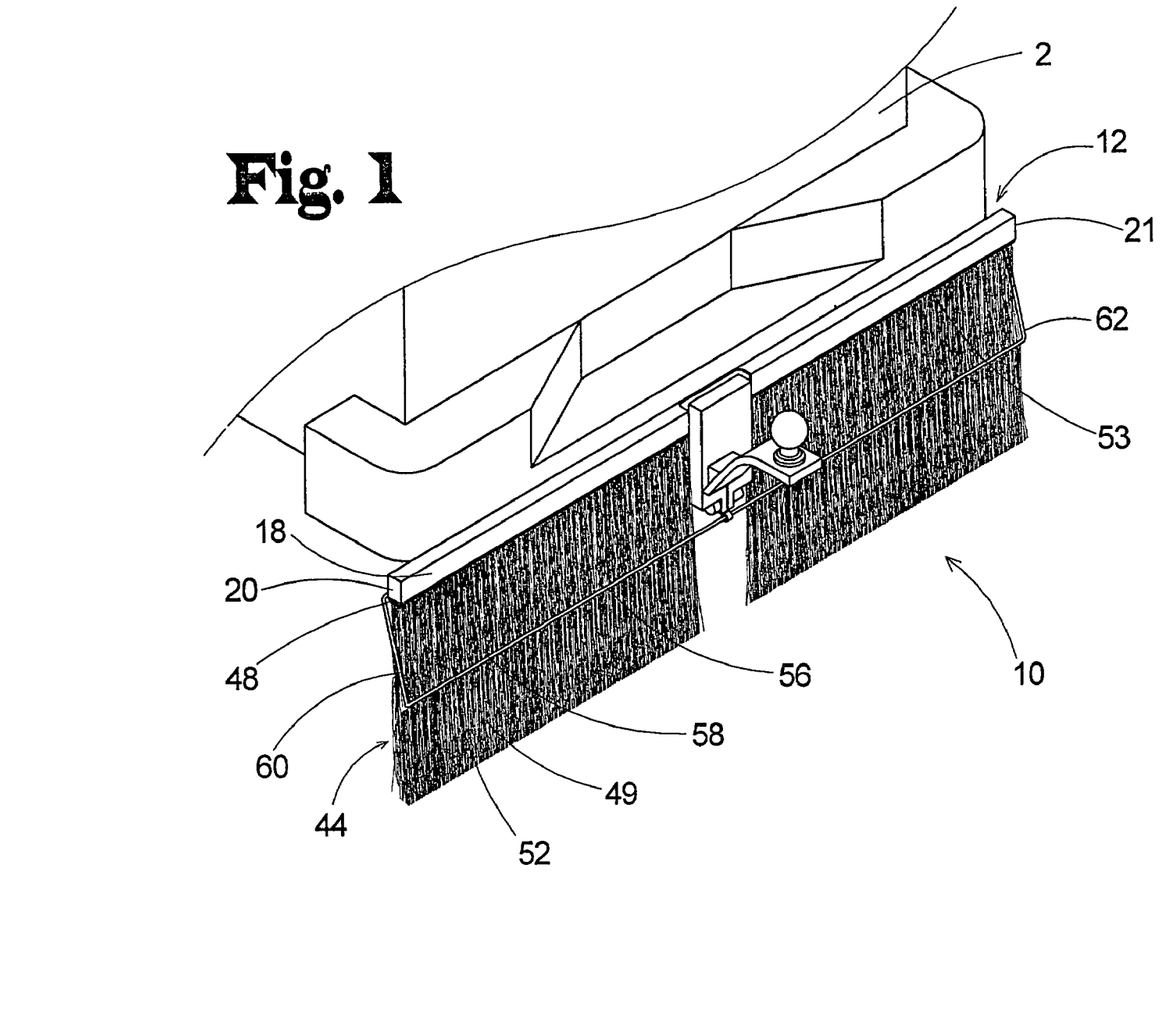
FIG. 1 is a schematic perspective view of a new trailer protection system according to the present invention mounted on the tow hitch assembly of a vehicle.

The system 10 of the invention is highly suitable for deflecting downwardly flying debris thrown by the tires of a vehicle to thereby protect objects being towed by the vehicle 2, and vehicles following close behind, from damage from the flying debris. The most suitable vehicles for use with the system of the invention have a tow hitch assembly 4 that includes a tow hitch receiver 6 that is relatively permanently mounted on and extends rearwardly from the vehicle, and a hitch ball support 8 that is removably mounted on the tow hitch receiver and extends rearwardly from the receiver when it is mounted thereon.

The system 10 of the invention may comprise a support assembly 12 for mounting on the tow hitch assembly 4 of the vehicle. The support assembly 12 has a bottom 14 for orienting downwardly when mounted on the vehicle 2 and a top 16 for orienting upwardly when mounted on the vehicle. The support assembly 12 may comprise an elongate support member 18 for extending transversely with respect to a longitudinal axis of the vehicle and having opposite ends 20, 21.

The support assembly 12 may also include means for removably mounting the support member 18 on the tow hitch assembly 4 of the vehicle in a substantially transverse orientation with respect to the longitudinal axis of the vehicle. The mounting means may be mounted on the support member 18, and may mount or support the support member 18 in a position above the tow hitch assembly 4 when the mounting means is engaged to and mounted on the tow hitch assembly 4. The mounting means may be located at approximately a middle location on the support member.

Figure 2:
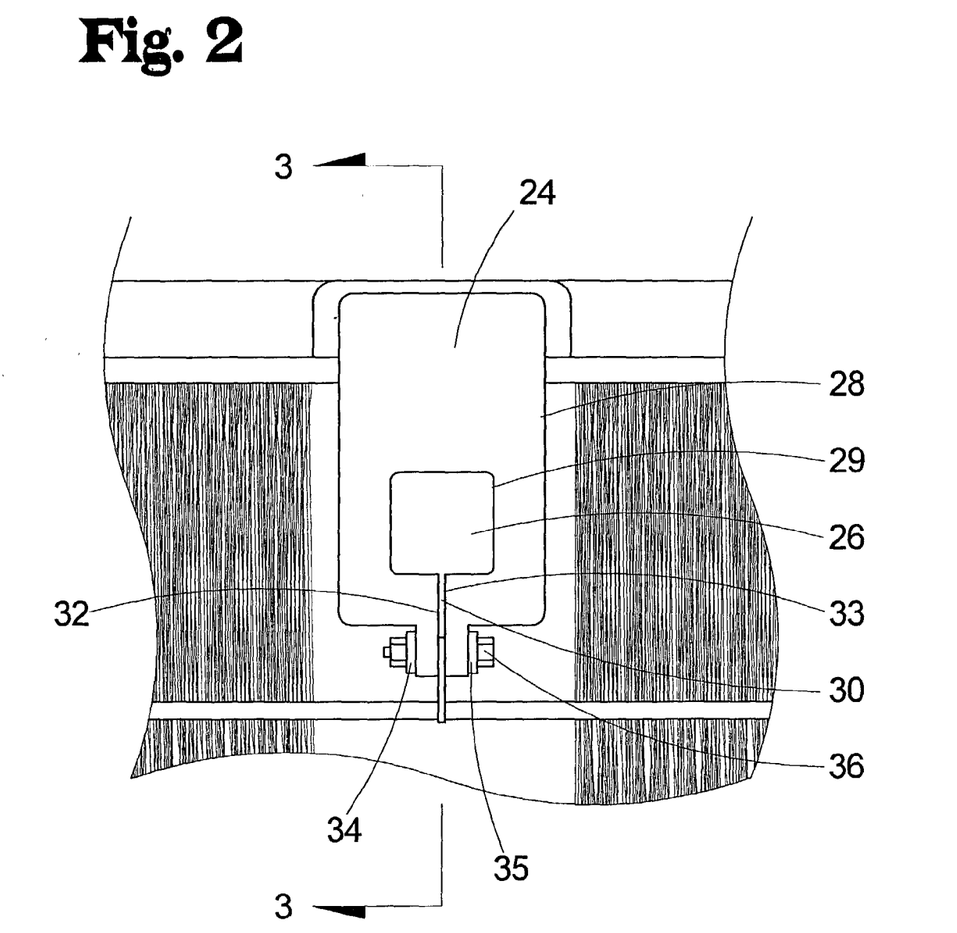
FIG. 2 is a schematic rear view of the mounting assembly of the present (the invention is described herein as if mounted on a vehicle, so that the front of the invention is directed in a forward direction of the vehicle and the rear of the invention is directed in a rearward direction of the vehicle).
Figure 3:
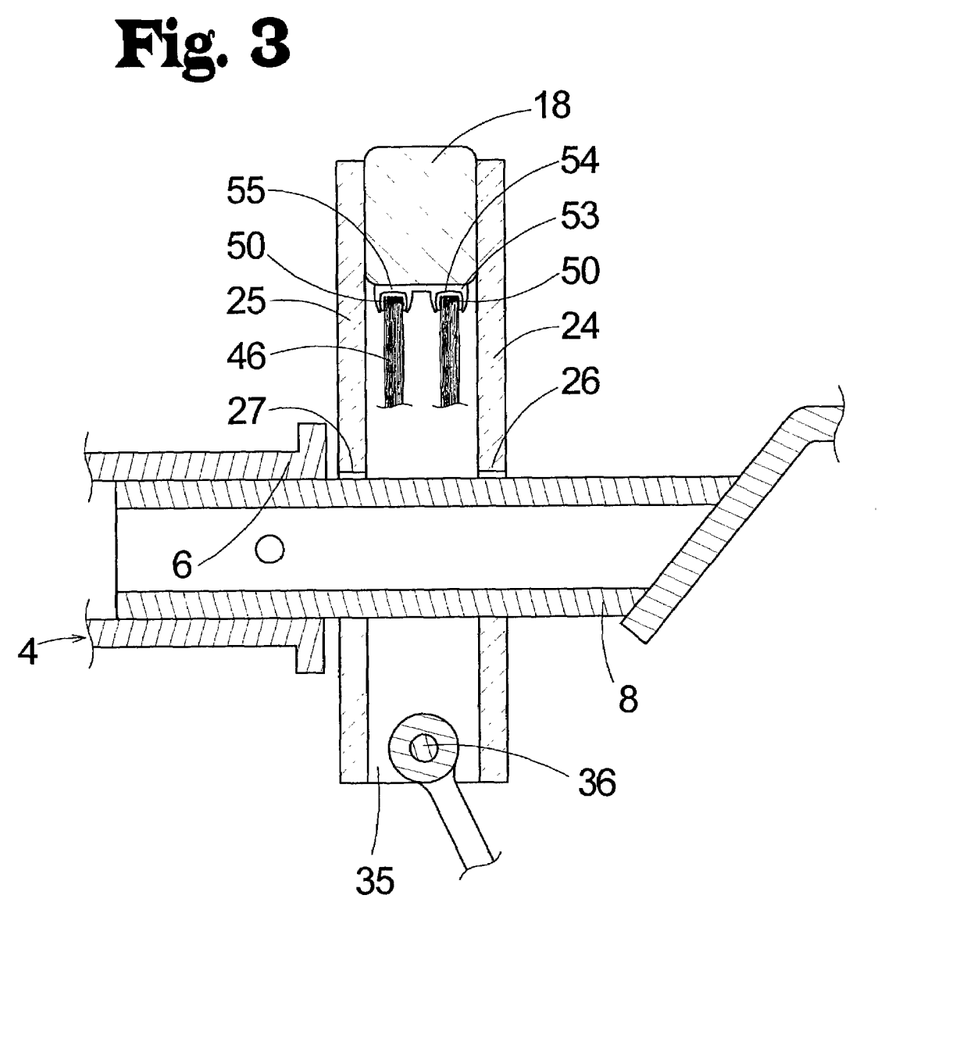
FIG. 3 is a schematic side sectional view of the mounting assembly of the present invention in relation to a how hitch assembly of the vehicle.
Figure 4:
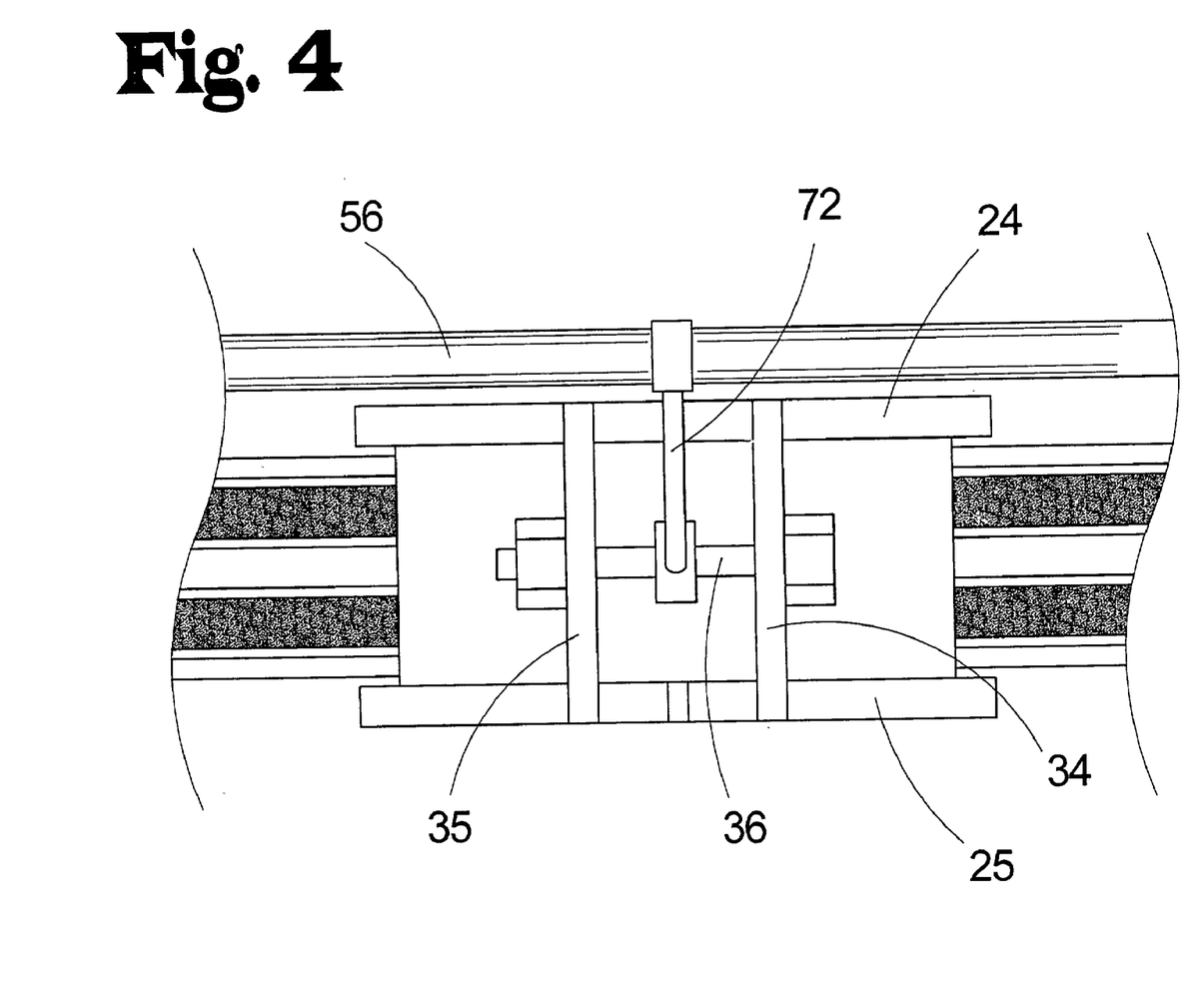
FIG. 4 is a schematic bottom view of the mounting assembly of the present invention.

In one highly preferred embodiment of the invention, the mounting means includes a clamp plate 24 mounted on the support member 18 that defines an aperture 26 for receiving a portion of the tow hitch assembly 4. It should be recognized that the aperture 26 may receive the hitch ball support 8, or the tow hitch receiver 6, of the tow hitch assembly, although the hitch ball support is generally the preferred part of the tow hitch assembly to be positioned in the aperture. A slot 30 may be formed in the clamp plate 24 that extends from (and is in communication with) the aperture 26 to an outer perimeter 28 of the clamp plate. The mounting means may also include means for selectively constricting or reducing a size of an inner perimeter 29 of the aperture 26 of the clamp plate 24 to thereby clamp the clamp plate on the portion of the tow hitch assembly that is received in the aperture of the clamp plate. The constriction means may span across the slot 30 in the clamp plate 24 and may be mounted on the clamp plate at locations on both sides of the slot 30 such that the constriction means is capable of selectively moving the sides 32, 33 of the slot 30 toward each other (and may also move them away from each other). In one embodiment of the invention, the constriction means comprises a first tab 34 mounted on the clamp plate 24 at or near a first one 32 of the sides of the slot 30, and a second tab 35 mounted on the clamp plate at or near a second one 33 of the sides of the slot. The constriction means may also include a fastener 36 mounted on the first 34 and second 35 tabs, and may span between the tabs across the slot 30 in a manner that permits the fastener to pull the tabs toward each other as the fastener is actuated. The fastener 36 may comprise a screw or a bolt and nut combination that extends through holes in each of the first and second tabs and bears on the tabs for effectively moving them toward each other when desired.

In one embodiment of the invention, the mounting means includes a pair of clamp plates 24, 25, with the clamp plate 25 also having an aperture 27. Preferably, the constriction means acts on both of the clamp plates simultaneously, although actuation of one of the pair of clamp plates is possible. The pair of clamp plates 24, 25 may be transversely spaced with respect to the longitudinal axis of the support member 18 for engaging the tow hitch assembly at spaced locations. Significantly, the employment of the pair of clamp plates not only provides greater resistance to twisting or pivoting of the support member 18 with respect to the tow hitch assembly, but also minimizes the direct pressure necessary to be applied by each of the clamp plates on the tow hitch assembly for achieving a secure mounting. Thus, there is less possibility for damage to the tow hitch assembly through structural crushing of the walls of the receiver 6 or marring of the exterior finish of the receiver. The clamp plate or plates may also serve to raise the vertical position of the support member 18 above the tow hitch assembly 4 to thereby minimize any gap between the support member and a rear bumper or other portion of the body of the vehicle.

Figure 6:
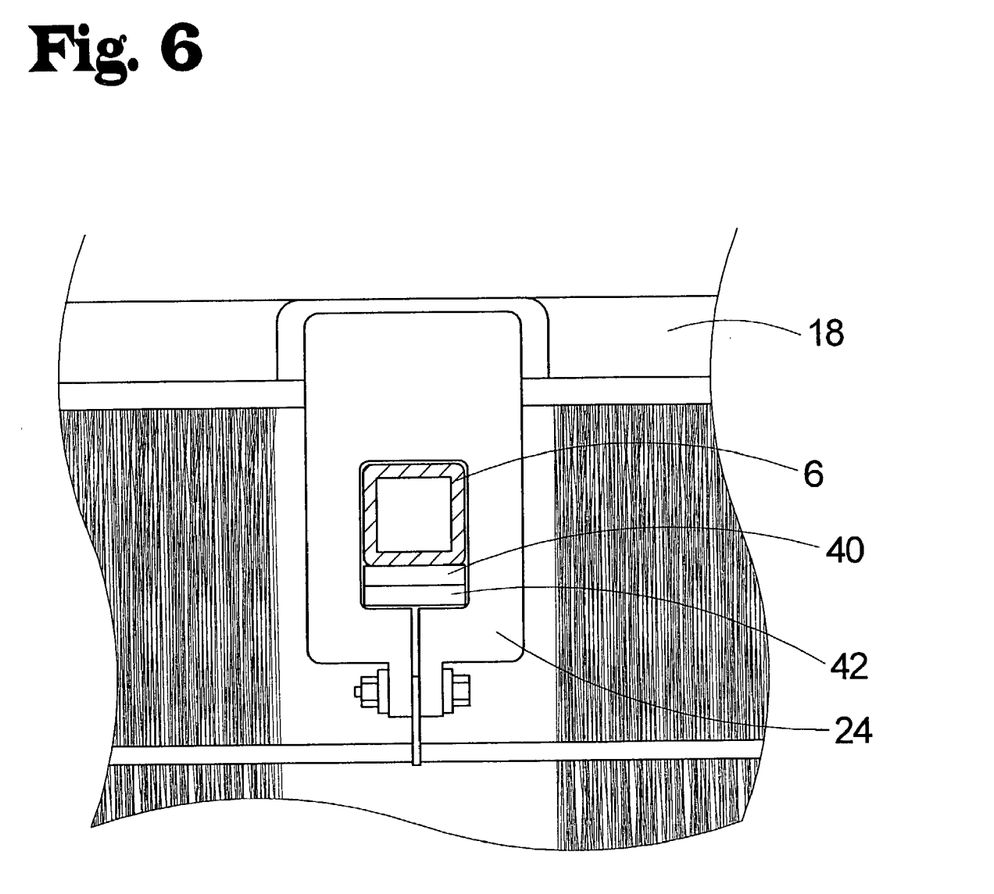
FIG. 6 is a schematic rear view of the present invention particularly illustrating the positioning plates positioned in the aperture of the clamp plate.

The system 10 of the invention may also optionally include positioning means for adjusting a position of the tow hitch assembly in the aperture of the clamp plate. In one embodiment of the invention, the positioning means includes at least one positioning plate 40, and optionally a plurality of positioning plates 40, 42, removably positioned in the aperture 26 of the clamp plate with the portion of the tow hitch assembly that is positioned in the aperture of the clamp plate. The positioning plate or plates function to separate the portion of the tow hitch assembly (positioned in the aperture or apertures) from a portion of the perimeter 29 of the aperture 26, 27 to shift the position of the portion of the tow hitch assembly in the aperture, to thereby raise or lower the position of the support member 18 with respect to the tow hitch assembly. In such an embodiment, the shape of the aperture 26, 27 may be elongated in the vertical direction to be substantially rectangular, and thereby permit positioning of the two hitch assembly at a plurality of positions in the aperture. The positioning plate or plates 40, 42 may be inserted to fill gaps between the tow hitch assembly and the portions of the aperture 26, 27. Each of the positioning plates 40, 42 has a thickness, and optionally at least two of the positioning plates have a different thickness such that different combinations of the plates may be positioned above and below the tow hitch assembly in the aperture.

The system 10 also includes a flexible deflection structure 44 that extends downwardly from the support member 18. The flexible deflection structure 44 may include a plurality of deflection elements 46 that extend downwardly and away from the support member 18. Each of the deflection elements 44 may have a base end 48 and a free end 49. Each of the deflection elements 46 may comprise a thin, elongate bristle that is flexible but resilient. One preferred material for the deflection elements is polypropylene, which is resistant to breakage in colder weather. The flexible deflection structure 44 may also include a base strip 50 that mounted on the base ends 48 of each of the plurality of deflection elements 46, and the base strip 50 holds all of the base ends of the deflection elements together in a substantially planar alignment.

The support assembly 12 of the system 10 may also include a mounting track 52 for mounting the deflection structure 44 on the support member 18. The mounting track 52 is adapted to removably receive a portion of the deflection structure 44. The mounting track 52 may be mounted on the bottom 14 of the support member of the support assembly. The mounting track 52 may extend along a portion of the support member.

The mounting track 52 may define at least one groove 54 for slidably receiving the base strip 50 of the deflection structure 44 for holding the deflection structure in a depending relationship to the support member 18. Significantly, in some embodiments of the invention, the mounting track 52 forms two grooves 54, 55 that extend parallel to the longitudinal axis of the support member 18 for receiving a pair of base strips 50 of two deflection assemblies. The grooves 54, 55 of the mounting track 52 are laterally spaced with respect to a longitudinal axis of the support member 18) such that the deflection elements 46 of the pair of deflection assemblies form a pair of laterally-spaced layers of deflection elements to provide enhanced debris deflection protection.

In one preferred embodiment of the invention, a pair of mounting tracks 52, 53 is mounted on the support member 18, with each of the mounting tracks being positioned along a longitudinal axis of the support member. Preferably, the mounting tracks 52, 53 may be longitudinally spaced to form a gap therebetween in which the mounting means is positioned.

Figure 5:
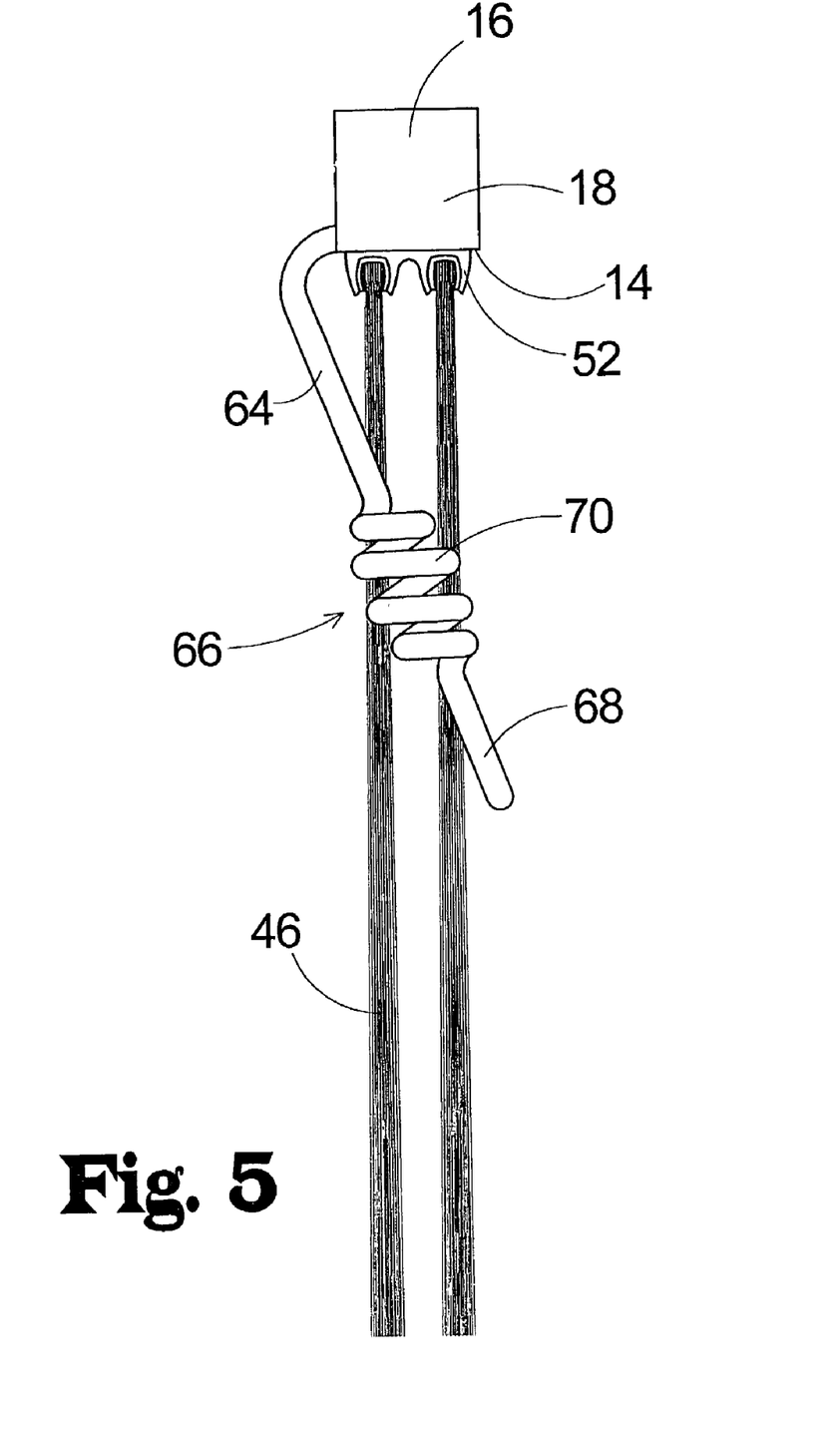
FIG. 5 is a schematic side view of the present invention particularly illustrating an optional reinforcing element.

One significant feature of the system 10 comprises means for reinforcing the deflection structure 44 for limiting rearward movement of the deflection structure when the deflection structure is mounted on the vehicle. While the relatively thin, elongate structure of the most preferred deflection elements 46 permits a significant amount of air flow between the elements, the elements are also relatively easily moved or bent rearwardly under the pressure of the air flow about a vehicle at typical highway speeds, which can thus decrease the protection afforded by the system 10. The reinforcing means may be positioned adjacent to an intermediate portion of or location on the deflection structure, such as a location approximately midway between the base end 48 and the free end 49 of the deflection elements. The reinforcing means thus may limit rearward movement of the deflection elements, while not significantly increasing the resistance to air flow through the deflection structure. The reinforcing means may comprise an elongate reinforcing element 56, and in one preferred embodiment of the invention, the reinforcing element is formed by a bar.

The reinforcing element 56 may conceptually be considered to be made up of multiple portions (even through the element may be formed of a single piece of material), including a first portion 58, a second portion 60, and a third portion 62. The first portion 58 extends substantially transverse to the deflection structure 44, and oriented in a direction substantially perpendicular to a longitudinal axis of the deflection elements 46. The first portion 58 of the reinforcing element 56 may be positioned adjacent to the deflection elements 46 at a midpoint between the ends 48, 49 of the deflection elements for resisting rearward movement of the deflection elements at the midpoint.

The second 60 and third 62 portions of the reinforcing element 56 each extend from one of opposite ends of the first portion 58, and the portions 60, 62 may extend substantially perpendicular to the first portion. The second 60 and third 62 portions of the reinforcing element 56 extend downwardly from the support member 18 to the first portion 58. In one embodiment of the invention, the second and third portions of the reinforcing element 56 extend through a plane defined by the deflection elements 46 of the deflection structure.

In one embodiment of the invention, the second 60 and third 62 portions of the reinforcing element are substantially rigid for resisting movement of the first portion 58 with respect to the support member 18.

In another embodiment of the invention, the second 60 and third 62 portions of the reinforcing element 56 each have opposite ends, and each of the second and third portions is resiliently flexible between the opposite ends for permitting movement of one of the opposite ends with respect to the other of the opposite ends, which thereby permits movement of the first portion 58 with respect to the support member 18. In such an embodiment of the invention, the second 60 and third 62 portions each have first 64, second 66, and third 68 sections. The first 64 and third 68 sections may be relatively and substantially rigid, and the second section 66 is relatively flexible. In one preferred embodiment of the invention, the second section 66 comprises an elongate spring 70 that supports the first 64 and third 68 sections in a longitudinally aligned orientation. The spring 70, such as a barrel spring commonly found on whip-type antennas, permits the third section 68 and the first portion 58 to pivot or rotate with respect to the first section 64 and the support member 18, which can be advantageous when debris or other obstructions on the road are encountered, or when the rear of the vehicle dips downwardly when entering a driveway, and the first section might otherwise be damaged if the first section were held rigidly in place with respect to the tow hitch assembly.

Optionally, a central support 72 may be included to provide additional support to the reinforcing element 56, and especially for a medial portion of the reinforcing element. The central support 72 may be mounted on the reinforcing element 56 to link the reinforcing element 56 to the support assembly 12, and may be linked through the mounting assembly. More specifically, the central support 72 may connect the reinforcing element to the clamp plate 24 or the constriction means of the mounting assembly to provide additional support to a medial location of the reinforcing element.

As a further option, the system 10 of the invention may be mounted on an intermediate structure that is mounted between the tow hitch receiver 6 and the hitch ball support 8, such that the hitch ball support may be removed from the vehicle without dismounting the system 10 from the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may-be resorted to, falling within the scope of the invention.

We claim:

1. A system for deflecting downwardly flying debris thrown rearwardly by the tires of a vehicle having a tow hitch assembly, the tow hitch assembly comprising a tow hitch receiver and a hitch ball support, the system comprising:
   a support assembly for being supported on the tow hitch assembly of the vehicle, the support assembly having a bottom for orienting downwardly and a top for orienting upwardly when supported on the vehicle;
   mounting means for removably mounting the support assembly on the tow hitch assembly of the vehicle in a transverse orientation with respect to a longitudinal axis of the vehicle;
   a flexible deflection structure extending downwardly from the support assembly;
   reinforcing means for limiting rearward movement of the deflection structure when the deflection structure is mounted on the vehicle, the reinforcing means comprising an elongate reinforcing element, the reinforcing element comprising:
      a first portion of the reinforcing element extending transverse to and rearwardly of the deflection structure;
      second and third portions of the reinforcing element each extending from one of opposite ends of the first portion in a substantially perpendicular relationship to the first portion, the second and third portions of the reinforcing element extending rearwardly and downwardly from the support assembly to the first portion, the second and third portions of the reinforcing element extending through a plane defined by the deflection structure in a skewed relationship to the plane.

2. The system of claim 1 wherein the second and third portions of the reinforcing element are substantially rigid for resisting movement of the first portion with respect to the support assembly.

3. The system of claim 1 wherein the second- and third portions of the reinforcing element each have opposite ends, the second and third portions each being resiliently flexible between the opposite ends for permitting movement of one of the opposite ends with respect to the other of the opposite ends such that the first portion of the reinforcing element is moveable with respect to the support assembly.

4. The system of claim 1 wherein the second and third portions of the reinforcing element each include an elongate spring that is resiliently flexible along a longitudinal axis thereof.

5. The system of claim 4 wherein the reinforcing element includes first, second, and third sections, the first and third sections being substantially rigid and the second section comprising the elongate spring, the elongate spring biasing the first and third sections into a longitudinally aligned orientation.

6. The system of claim 1 wherein the flexible deflection structure comprises:
   a plurality of deflection elements extending away from the support assembly in substantially the same direction, each of the deflection elements having a base end and a free end; and
   a base strip mounted on the base ends of each of the plurality of deflection elements.

7. The system of claim 6 additionally comprising a mounting track for mounting the deflection structure on the support member, the mounting track defining at least one groove for removably slidably receiving the base strip of the deflection structure, the mounting track being mounted on the bottom of the support assembly and extending along a portion of the support member.

8. The system of claim 1 wherein the mounting track forms two grooves extending parallel to the longitudinal axis of the support assembly for receiving a pair of base strips of deflection assemblies, the grooves of the mounting track being laterally spaced such that the deflection elements of a pair of deflection assemblies form a pair of layers laterally-spaced layers of deflection elements.

9. A system for deflecting downwardly flying debris thrown rearwardly by the tires of a vehicle having a tow hitch assembly, the tow hitch assembly comprising a tow hitch receiver and a hitch ball support, the system comprising:
   a support assembly for being supported on the tow hitch assembly of the vehicle, the support assembly having a bottom for orienting downwardly and a top for orienting upwardly when supported on the vehicle;
   a flexible deflection structure extending downwardly from the support assembly;
   reinforcing means for limiting rearward movement of the deflection structure when the deflection structure is mounted on the vehicle;
   a mounting assembly for removably mounting the support assembly on the tow hitch assembly of the vehicle in a transverse orientation, the mounting assembly comprising:
      a clamp plate mounted on the support assembly and defining an aperture for receiving a portion of the tow hitch assembly, a slot being formed in the clamp plate and extending from the aperture to an outer perimeter of the clamp plate; and constriction means for selectively reducing a site of an inner perimeter of the aperture of the clamp plate to thereby clamp the clamp plate on the portion of the tow hitch assembly;

wherein the mounting assembly comprises a pair of the clamp plates and the constriction means acts on both of the clamp plates.

10. The system of claim 9 wherein the constriction means spans the slot in the clamp plate and is mounted on clamp plate at locations on both sides of the slot for selectively moving the sides of the slot closer together.

11. The system of claim 9 wherein the pair of clamp plates are transversely spaced with respect to the longitudinal axis of the support assembly for engaging spaced locations on the tow hitch assembly.

12. The system of claim 9 wherein the mounting assembly supports the support assembly in a position above the tow hitch assembly when the mounting assembly is mounted on the tow hitch assembly.

13. The system of claim 9 wherein the pair of clamp plates are transversely spaced with respect to a longitudinal axis of the support assembly.

14. A system for deflecting downwardly flying debris thrown rearwardly by the tires of a vehicle having a tow hitch assembly, the tow hitch assembly comprising a tow hitch receiver and a hitch ball support, the system comprising:

a support assembly for being supported on the tow hitch assembly of the vehicle, the support assembly having a bottom for orienting downwardly and a top for orienting upwardly when supported on the vehicle;

a flexible deflection structure extending downwardly from the support assembly;

reinforcing means for limiting rearward movement of the deflection structure when the deflection structure is mounted on the vehicle;

a mounting assembly for removably mounting the support assembly on the tow hitch assembly of the vehicle in a transverse orientation, the mounting assembly comprising;

a clamp plate mounted on the support assembly and defining an aperture for receiving a portion of the tow hitch assembly, a slot being formed in the clamp plate and extending from the aperture to an outer perimeter of the claim plate; and positioning means for adjusting a position of the tow hitch assembly in the aperture of the clamp plate.

15. The system of claim 14 wherein the positioning means comprise at least one positioning member removably positioned in the aperture of the clamp plate for abutting against a portion of the tow hitch assembly positioned in the aperture of the clamp plate for separating the portion of the tow hitch assembly from a portion of the perimeter of the aperture to shift the position of the portion of the tow hitch assembly in the aperture.

16. The system of claim 15 wherein a plurality of the positioning plates are removably positioned in the aperture, each of the positioning plates having a thickness, at least two of the positioning plates having a different thickness.

17. A system for deflecting downwardly flying debris thrown rearwardly by the tires of a vehicle having a tow hitch assembly, the tow hitch assembly comprising a tow hitch receiver and a hitch ball support, the system comprising:

a support assembly for being supported on the tow hitch assembly of the vehicle, the support assembly having a bottom for orienting downwardly and a top for orienting upwardly when supported on the vehicle;

mounting means for removably mounting the support assembly on the tow hitch assembly of the vehicle in a transverse orientation with respect to a longitudinal axis of the vehicle;

a flexible deflection structure extending downwardly from the support assembly;

a mounting track for mounting the deflection structure on the support member, the mounting track slidably receiving a portion of the deflection structure, the mounting track being mounted on the bottom of the support member and extending along a portion of the support member;

wherein the flexible deflection structure includes a base strip, and wherein the mounting track defines at least one groove for slidably receiving the base strip of the flexible deflection structure; and wherein the mounting track forms two grooves extending substantially parallel to the longitudinal axis of the support assembly for each receiving the base strip of a pair of deflection assemblies, the grooves of the mounting track being laterally spaced such that deflection elements of the pair of deflection assemblies form a pair of laterally-spaced layers of deflection elements.

18. A system for deflecting downwardly flying debris thrown rearwardly by the tires of a vehicle having a tow hitch assembly, the tow hitch assembly comprising a tow hitch receiver and a hitch ball support, the system comprising:

a support assembly for mounting on the tow hitch assembly of the vehicle, the support assembly having a bottom for orienting downwardly and a top for orienting upwardly when supported on the vehicle;

mounting means for removably mounting the support assembly on the tow hitch assembly of the vehicle in a transverse orientation with respect to a longitudinal axis of the vehicle;

a flexible deflection structure extending downwardly from the support assembly;

an elongate reinforcing element for limiting rearward movement of the deflection structure when the deflection structure is mounted on the vehicle, the reinforcing element comprising first, second and third portions, the first portion extending rearwardly of the deflection structure, the second and third portions each extending forwardly from the first portion and being mounted on the support assembly;

wherein at least the second and third portions of the elongate reinforcing element are substantially rigid to resist movement of the first portion relative to the support assembly.

19. The system of claim 18 wherein the second and third portions of the reinforcing element extend through a plane defined by the deflection structure in a skewed relationship to the plane.

* * * * *